United States Patent
McCauley et al.

(10) Patent No.: US 8,827,806 B2
(45) Date of Patent: Sep. 9, 2014

(54) MUSIC VIDEO GAME AND GUITAR-LIKE GAME CONTROLLER

(75) Inventors: Jack J. McCauley, Danville, CA (US); Brian Bright, Woodland Hills, CA (US); John Devecka, Budd Lake, NJ (US)

(73) Assignee: Activision Publishing, Inc., Santa Monica, CA (US)

( * ) Notice: Subject to any disclaimer, the term of this patent is extended or adjusted under 35 U.S.C. 154(b) by 1518 days.

(21) Appl. No.: 12/124,112

(22) Filed: May 20, 2008

(65) Prior Publication Data

US 2009/0291756 A1 Nov. 26, 2009

(51) Int. Cl.
| | |
|---|---|
| A63F 9/24 | (2006.01) |
| A63F 13/02 | (2006.01) |
| G06F 17/00 | (2006.01) |
| A63F 13/98 | (2014.01) |
| A63F 13/40 | (2014.01) |
| G06F 3/0354 | (2013.01) |
| G10H 1/34 | (2006.01) |

(52) U.S. Cl.
CPC ................. *A63F 13/02* (2013.01); *A63F 13/10* (2013.01); *A63F 2300/1031* (2013.01); *A63F 2300/1043* (2013.01); *A63F 2300/1062* (2013.01); *A63F 2300/1068* (2013.01); *A63F 2300/305* (2013.01); *A63F 2300/6063* (2013.01); *A63F 2300/638* (2013.01); *A63F 2300/8047* (2013.01); *G06F 3/03547* (2013.01); *G10H 1/342* (2013.01); *G10H 2220/135* (2013.01)
USPC .................................. 463/36; 463/37; 463/38

(58) Field of Classification Search
USPC ...................................................... 463/36–38
See application file for complete search history.

(56) References Cited

U.S. PATENT DOCUMENTS

| | | | |
|---|---|---|---|
| 3,555,166 A | * | 1/1971 | Gasser ........................... 84/600 |
| 4,336,734 A | | 6/1982 | Polson |
| 4,867,028 A | | 9/1989 | Jones |
| 5,085,119 A | | 2/1992 | Cole |
| 5,095,799 A | | 3/1992 | Wallace et al. |
| 5,184,115 A | | 2/1993 | Black et al. |
| 5,278,346 A | | 1/1994 | Yamaguchi |
| 5,300,729 A | | 4/1994 | Tokunaga et al. |

(Continued)

FOREIGN PATENT DOCUMENTS

| | | |
|---|---|---|
| JP | 2001-96061 | 4/2001 |
| WO | WO 0124159 A1 * | 4/2001 |
| WO | WO2007/115072 | 10/2007 |

OTHER PUBLICATIONS

"Power Tour Electric Guitar", User's Guide, Tiger Electronics, 2007 (12 pgs.).

(Continued)

*Primary Examiner* — Werner Garner
(74) *Attorney, Agent, or Firm* — Klein, O'Neill & Singh, LLP

(57) ABSTRACT

A music video game provides a guitar shaped video game controller with an analog control device with touch sensor. In some embodiments the analog control device is in the form of a touch sensitive pad on a neck of a guitar shaped video game compeller. In some embodiments, the analog control device may resemble additional buttons on a neck of a guitar shaped video game controller. The analog control device may be used to simulate various techniques which may be performed on strings of a guitar.

8 Claims, 8 Drawing Sheets

(56) References Cited

U.S. PATENT DOCUMENTS

| | | | |
|---|---|---|---|
| 5,393,926 | A | 2/1995 | Johnson |
| 5,398,585 | A | 3/1995 | Starr |
| 5,425,297 | A | 6/1995 | Young, Jr. |
| 5,557,057 | A | 9/1996 | Starr |
| 5,583,308 | A | 12/1996 | Owen |
| 5,602,356 | A | 2/1997 | Mohrbacher |
| 5,627,335 | A | 5/1997 | Rigopulos et al. |
| 5,670,729 | A | 9/1997 | Miller et al. |
| 5,726,372 | A | 3/1998 | Eventoff et al. |
| 5,726,374 | A | 3/1998 | Vandervoort |
| 5,739,455 | A | 4/1998 | Poon |
| 5,763,804 | A | 6/1998 | Rigopulos et al. |
| 5,777,251 | A | 7/1998 | Hotta et al. |
| 5,923,317 | A * | 7/1999 | Sayler et al. .................. 345/156 |
| 6,011,212 | A | 1/2000 | Rigopulos et al. |
| 6,018,119 | A | 1/2000 | Mladek |
| 6,063,994 | A | 5/2000 | Kew et al. |
| 6,225,547 | B1 | 5/2001 | Toyama et al. |
| 6,362,411 | B1 | 3/2002 | Suzuki et al. |
| 6,390,923 | B1 | 5/2002 | Yoshitomi et al. |
| 6,657,616 | B2 | 12/2003 | Sims |
| 7,044,857 | B1 | 5/2006 | Klitsner et al. |
| 7,320,643 | B1 | 1/2008 | Brosius et al. |
| 2005/0126378 | A1* | 6/2005 | Ludwig ........................... 84/746 |
| 2007/0256541 | A1 | 11/2007 | McCauley |
| 2007/0295196 | A1 | 12/2007 | Raisanen |
| 2008/0048997 | A1* | 2/2008 | Gillespie et al. .............. 345/174 |
| 2008/0139309 | A1* | 6/2008 | Siegel et al. .................... 463/31 |
| 2008/0220864 | A1* | 9/2008 | Brosius et al. .................. 463/33 |
| 2009/0258686 | A1 | 10/2009 | McCauley et al. |

OTHER PUBLICATIONS

International Search Report on corresponding PCT application (PCT/US2009/044748) from International Searching Authority (KIPO) dated Dec. 30, 2009.

Written Opinion on corresponding PCT application (PCT/US2009/044748) from International Searching Authority (KIPO) dated Dec. 30, 2009.

\* cited by examiner

MUSIC VIDEO GAME AND GUITAR-LIKE GAME CONTROLLER

BACKGROUND OF THE INVENTION

The present invention relates generally to video games, and more particularly to a music rhythm video game with a guitar shaped video game controller including an analog control feature.

Video games provide a source of entertainment for many people. Video games provide an interactive experience for a player, an experience that can be both interesting and challenging. Video games may provide players the opportunity to engage in activities otherwise unavailable to them, or activities which may, except through the simplification provided by video games, otherwise require extensive training or practice. Video games may also provide for increasing levels of difficulty, allowing for growth of player capabilities.

Music based video games utilizing simulated musical instruments are popular among some. Video game controllers used in such games may generally replicate the shape of a musical instrument, allowing players the opportunity to more fully enmesh themselves in a music creation experience. Furthermore, proficiency at playing simulated musical instruments in video game environments may be more easily achieved than becoming proficient at using real musical instruments. Therefore, in many instances, much of the joy associated with successfully playing a musical instrument may be experienced even if a player has not contributed years to practicing and mastering the craft. Those who may have obtained mastery of a musical instrument, however, may find that musical video games are incomplete and not sufficiently challenging. Similarly, non-musicians who have become sufficiently proficient may find that the music video game no longer quires sufficient attention and concentration.

SUMMARY OF THE INVENTION

The invention provides a music video game and a guitar-like game controller. In one aspect the invention provides a video game controller, comprising: a body; a neck extending from the body; a plurality of fret inputs on the neck; an analog control device on the neck between the fret inputs and the body; and circuitry for providing an input signal from the analog control device to a video game console.

In another aspect the invention provides a system for providing a game play interface in a music rhythm video game, comprising: a display; at least one video game controller in a shape of a guitar and having an analog control device including a touch sensor; and a processor, the video game controller configured for data communication with the processor, the processor including program instructions for: commanding a display of user instructions on a display, the user instructions indicating desired operation of the analog control device and timing of operation of the analog control device; receiving input signals from the at least one video game controller based on user manipulations of the analog control device; determining user compliance with the user instructions; and generating video output information indicating status of the user manipulations and adjusting a user score based on the user compliance.

In another aspect the invention provides a method of generating an input signal for an analog control device on a video game controller, comprising: detecting contact along a longitudinal axis of the analog control device; determining a position along the longitudinal axis where the contact was made; mapping the determined position onto an input signal recognizable by a video game console communicating with the video game controller; and transmitting the input signal to the video game console.

In another aspect the invention provides a guitar shaped video game controller including an analog control device, comprising: a recessed surface molded into an exterior face of a surface of a neck of the guitar shaped video game controller; and a printed circuit board with touch sensors attached to an interior face of the surface opposite the recessed surface; wherein the printed circuit board detects contact made to the recessed surface; and wherein control circuitry of the guitar shaped video game controller generates an input signal recognizable by an associated video game console, the input signal corresponding to the position of contact made on the recessed surface.

In another aspect the invention provides a method of determining user compliance with user instructions in a music based video game, comprising commanding a display including a visual representation of user instructions and further user instructions; wherein user compliance with the user instructions is based on operation of a plurality of fret buttons located on a neck of a guitar shaped video game controller in conjunction with operation of a strum bar on a body of the guitar shaped video game controller; and wherein user compliance with the further user instructions is based solely on operation of an additional input source located on the neck of the guitar shaped video game controller and separated from the first set of input devices.

In another aspect the invention provides a method of generating audio outputs in a music based video game, comprising: receiving input signals from a guitar shaped video game controller, the video game controller including a body with a strum input, and a neck extending from the body with a plurality of fret inputs and an analog control device; processing the received input signals; and generating audio samples based on the received input signals.

These and other aspects of the invention are more fully comprehended upon review of this disclosure.

DETAILED DESCRIPTION

Figure 1:
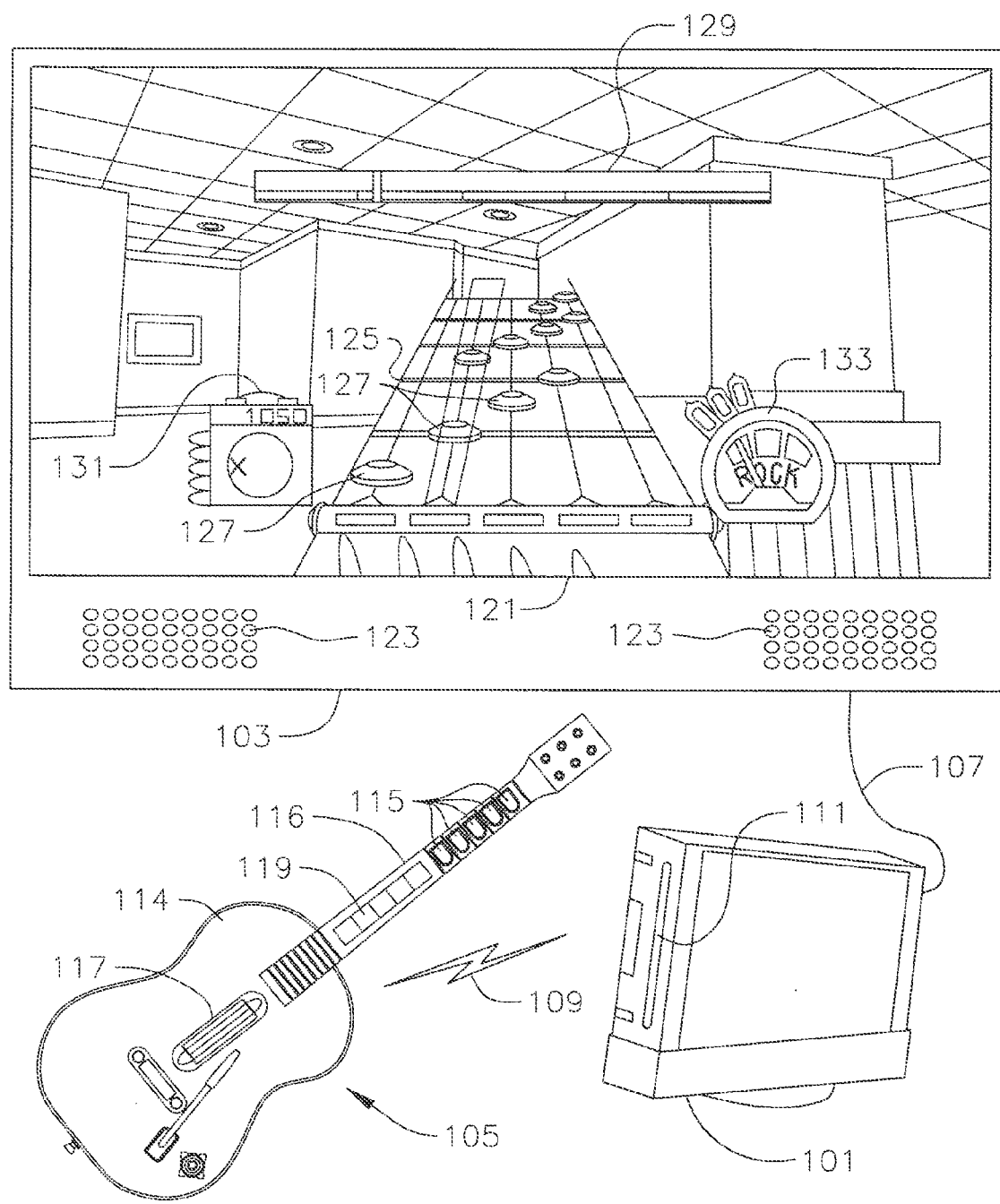
FIG. 1 is an example of a video game system in accordance with aspects of the invention.

FIG. 1 is an example of a video game system in accordance with aspects of the invention. In most embodiments, the video game system includes a video game console 101, a display unit 103, and at least one video game controller 105. The video game console is connected to the display unit via an audio-video cable 107, and with the video game controllers. In the embodiment of FIG. 1, the connection between the video game controller and the video game console is a wireless connection 109. In other embodiments, the connection may be facilitated by a cable between the video game controller and the video game console.

The video game console includes internal circuitry for processing video game instructions. The video game console generally includes at least one processor, memory, and other circuitry, for example, graphics circuitry and interface circuitry. For example, the video game console in FIG. 1 includes at least a removable memory interface 111 for a removable memory source holding video game instructions, such as a video game CD-ROM, an audio-video interface for connecting to the display unit, and a wireless communication interface for communicating with the video game controller.

The video game controller is a guitar shaped video game controller, with a body 114 and a neck 116 extending from the body. The body includes a strum bar 117, which provides for a strum input. The neck includes a plurality of fret buttons 115 and an analog control 119. As illustrated, the analog control is closer to the guitar body than are the fret button devices, although in other embodiments the analog control may be farther from the guitar body than are the fret button devices, and in some embodiments the analog control may be on the guitar body. In most embodiments the analog control may be in the form of a slider input comprising one or more touch sensitive pads. In some embodiments, the analog control may alternatively be located on the body of the video game controller instead of the neck.

The input devices of the video game controller are manipulated by a user of the video game controller, and generate input signals based on the user manipulations. The video game console receives the input signals generated by the video game controller and processes the video game based on the received input signals. In various combinations, the video game console may simultaneously receive and process input signals from more than one connected video game controller.

As previously mentioned, the video game console is also connected to a display unit via an audio-video cable. In some embodiments a personal computer is used in place of the video game console, with a monitor or display screen associated with the personal computer used for the display unit. In most embodiments, the display unit includes a display screen 121 and at least one set of audio speakers 123. Typically, the display unit is a television with both audio and video output capabilities.

The display unit in FIG. 1 shows a screen shot of video game play in a music rhythm video game. The screen shot shows an interactive music track 125 with a plurality of gems, for example, gems 127, providing user instructions as to instructed user manipulation of inputs of the guitar controller during video game play. The screen shot also includes a slide bar 129. In some embodiments the slide bar indicates a portion or portions of the analog control that is to be depressed or contacted at a given time. In other embodiments the slide bar indicates a portion or portions of the analog control which are currently a depressed, contacted, or otherwise activated. Other features of the screen shot include, for example, a user score indicator 131 and a power meter 133.

In the music rhythm video game of FIG. 1, the video game console processor receives input signals from the video game controller. In most embodiments, user instructions are retrieved from the removable memory source holding video game instructions, and a visual representation of the user instructions are displayed on the display unit. A user of the video game attempts to manipulate the video game controller in compliance with the user instructions. For example, the gems may represent instructions to depress a corresponding fret button, possibly with a corresponding strum of the strum bar, when the game reaches a NOW bar 128. Input signals corresponding to the user manipulations on the video game controller are generated and transmitted to the video game console. The video game console compares the input signals for compliance with the user instructions, and determines whether the user has complied or the extent to which the user has complied with the user instructions. A score is assigned to the user based on extent of user compliance with the user instructions.

Figure 2:
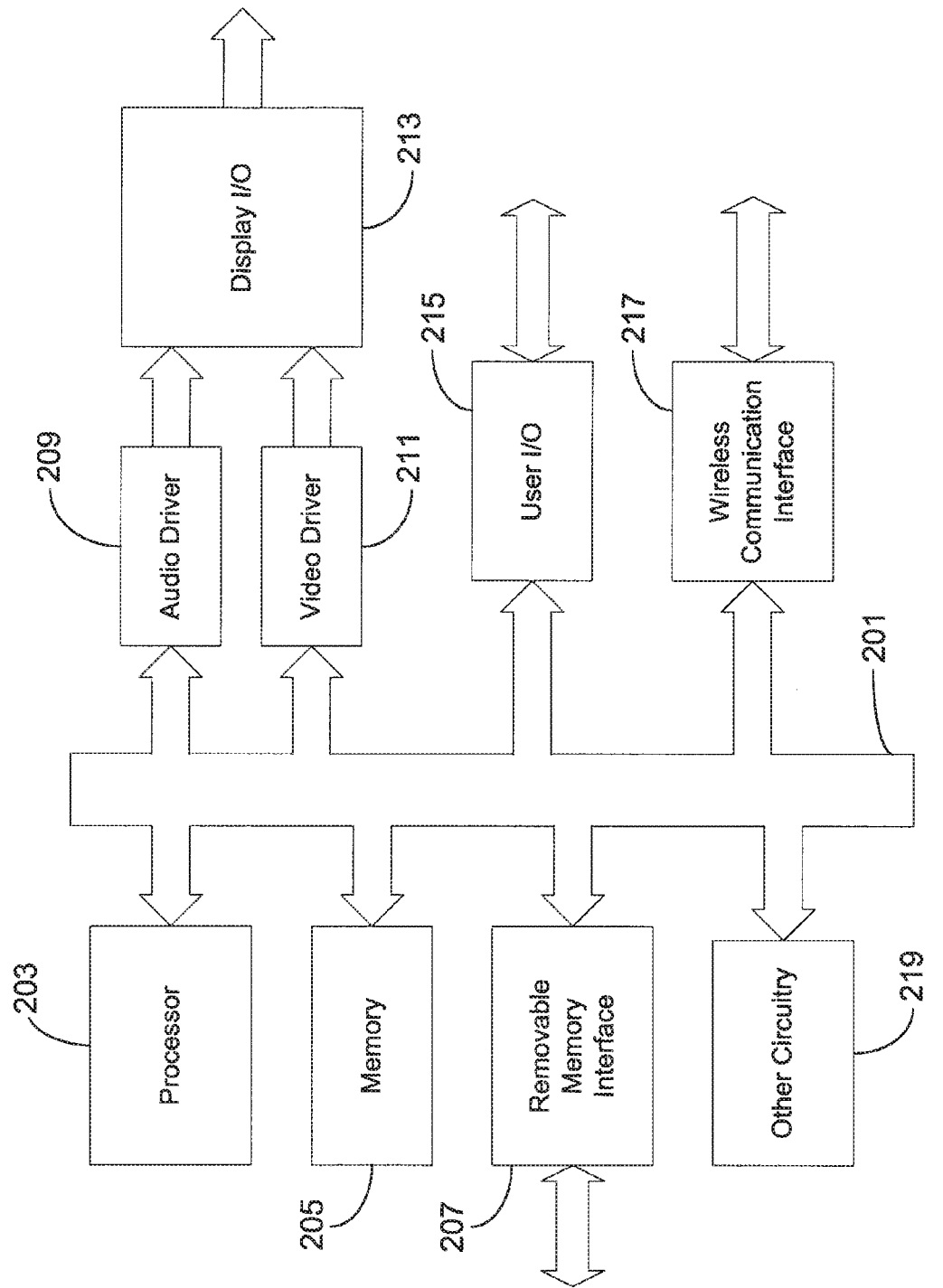
FIG. 2 is an example of a block diagram of a processing unit of a video game console in accordance with aspects of the invention.

FIG. 2 is an example of a block diagram of a processing unit of a video game console in accordance with aspects of the invention. In the embodiment of FIG. 2, the processing unit includes a bus 201 interconnecting a processor 203, memory 205, a removable memory interface 207, an audio driver 209 and a video driver 211, a display input/output port 213, a user input/output port 215, a wireless communication interface 217, and other circuitry 219. In various embodiments of the invention, the processing unit may include various different combinations of components to suit the particular application of each individual embodiment.

In operation, the processor executes video game instructions to facilitate game play for a particular video game. The processor may communicate with each individual component in the processing unit as needed to facilitate video game play. In most embodiments, the processor retrieves specific instructions for a video game from a removable memory source holding information for the particular video game. The processor may process the video game instructions based on general program instructions the processor retrieves from the memory. Video game execution is also based, in part, on input signals received from connected video game controller or controllers, which communicate with the processor through either the user input/output port or through a wireless connection interface, as was illustrated in FIG. 1. The processor processes the various instructions and input signals it receives to generate data associated with the proper execution of the video game, for example, audio and video data related to video game action.

The video game console sends generated audio and video data to the display unit through the display input/output port. In some embodiments, the processor sends audio and video generation instructions to an audio driver and a video driver, respectively. The audio and video drivers generate audio and video output signals with the generation instructions and forward the output signals to the display input/output port. In the embodiment of FIG. 2, the port is a combined audio and video input/output port, but in some embodiments, separate audio and video input/output ports may instead be used.

Figure 3:
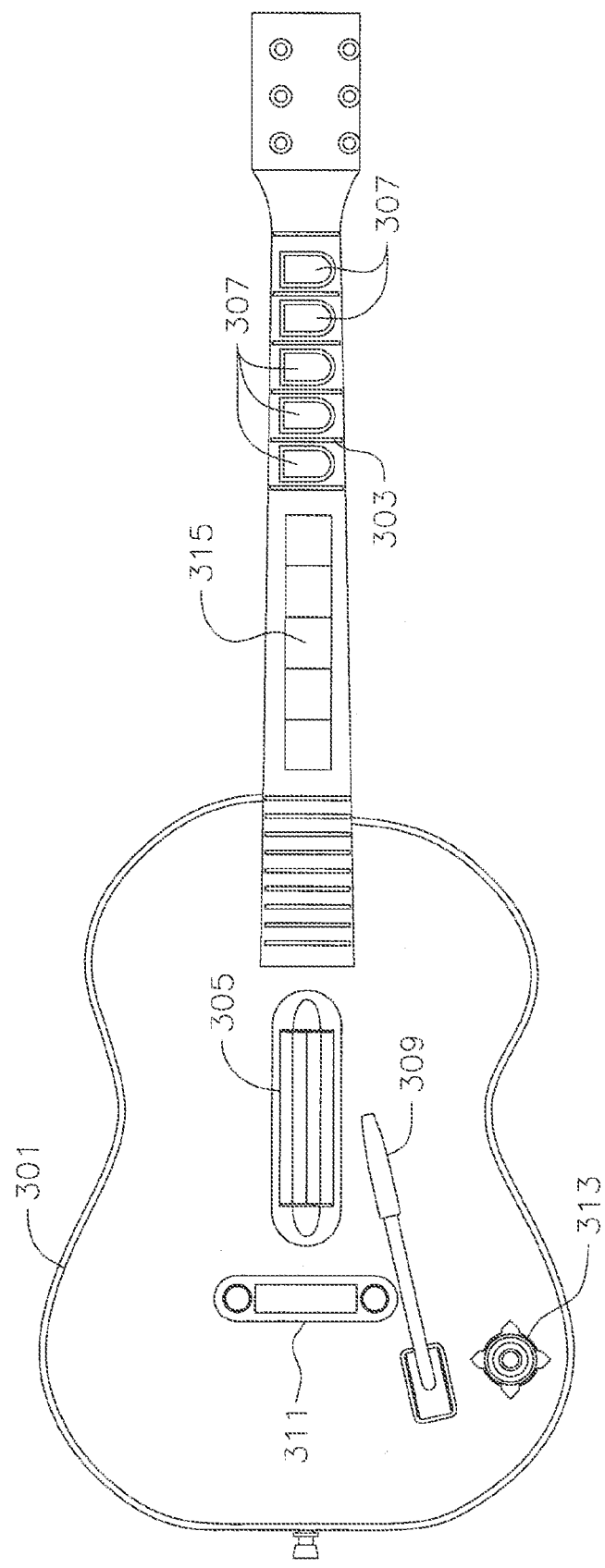
FIG. 3 is an illustration of a guitar shaped video game controller including an analog control device in accordance with aspects of the invention.

FIG. 3 is an illustration of a guitar shaped video game controller including an analog control device in accordance with aspects of the invention. The guitar shaped video game controller may be used in conjunction with a music rhythm video game, for example, the video game discussed in FIG. 1. In video game operation, manipulations of the different input devices on the video game controller produce a series of input signals. The series of input signals are communicated to a video game console to affect video game play.

In the embodiment illustrated in FIG. 3, the guitar shaped video game controller includes a guitar body 301 and a neck 303 extending from the body. The guitar shaped video game controller includes a variety of different input devices. For example, a strum bar 305 is located near the center of the body, and a plurality of fret buttons 307 are located near the end of the neck opposite the body. A tremolo arm assembly 309 extends from the body of the video game controller, and other inputs, for example, a star power input 311 and an analog control stick 313, may also be located on the body. In other embodiments, other input buttons, for example, a palm mute button and/or additional select buttons may be found on the body of the video game controller.

The plurality of fret buttons on similar guitar shaped video game controllers may be considered to serve as partial replacements for strings on a real guitar. From a basic chord fingering standpoint, the fret buttons may provide an adequate digital alternative to guitar strings. However, fret buttons do not provide the range of versatility of regular guitar strings. For example, sliding fingers up and down guitar strings may be desirable, a technique which may be difficult to perform on a set of discrete input devices such as the fret buttons. Also, for example, fingering chords closer to the guitar body typically results in chords of higher octaves, and electric guitar solos may often involve fingering guitar strings closer to the guitar body.

The guitar shaped video game controller provides an analog control device 315, in the form of a slider input. The slider input is located on the neck of the video game controller, typically between the body and the plurality of fret buttons. The slider input device includes a touch pad area, which may take the form of, for example, a rectangular touch pad area or a series of touch pad areas arranged longitudinally along a major axis of the neck of the video game controller. The touch pad or pads may provide a touch sensitive contact using, for example, radio frequency based sensors, capacitive based sensors, resistive based sensors, or other mechanisms commonly used with touch pads.

In the embodiment of FIG. 3, the analog control is illustrated as a rectangular touch pad. The touch pad may be slightly recessed from the surface of the neck to ease in locating the touch pad by feel during video game play. In many embodiments, the touch pad may also be segmented to identify different touch areas in conjunction with video game play. In the embodiment of FIG. 2, the touch pad is separated into five segments, although it is appreciated that more or less segments may be incorporated into the touch pad depending on the video game with which the video game controller is to be associated. In other embodiments, the analog control may be arranged as a series of either recessed or protruding input buttons. Preferably, the shape and arrangement of the input buttons in these embodiments differ sufficiently from the shape and arrangement of the fret buttons so as not to cause confusion for users during video game play. Furthermore, in some embodiments, the neck of the video game controller may also include physical markers, for example, an indentation, or a bump or bumps, at a predefined position or positions along a side or underside of the neck. For example, a bump may be located on the side of the neck of the guitar approximate a portion of the analog control most distant from the guitar body. Such physical or tactile markers may aid users in locating the touch pad or a particular section or segment of the touch pad by feel, without looking down at the video game controller and away from the display.

The various input devices are coupled to control circuitry within the video game controller. The control circuitry may connect the devices to a processing unit or other circuitry which generates input signals in response to user manipulations of the various input devices, and communicates the input signals to a connected video game console for further video game processing.

Figure 4A:
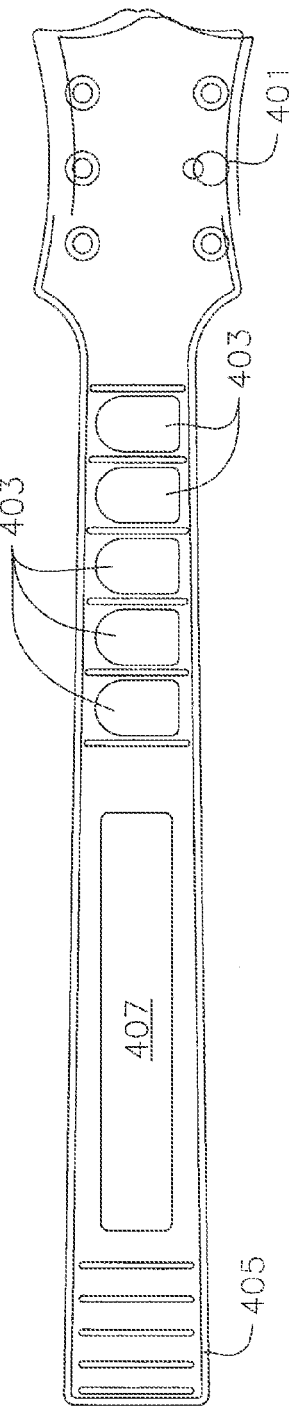
FIGS. 4a, 4b, and 4c are examples of necks of a guitar shaped video game controller with different embodiments of an analog control device in accordance with aspects of the invention.
Figure 4B:
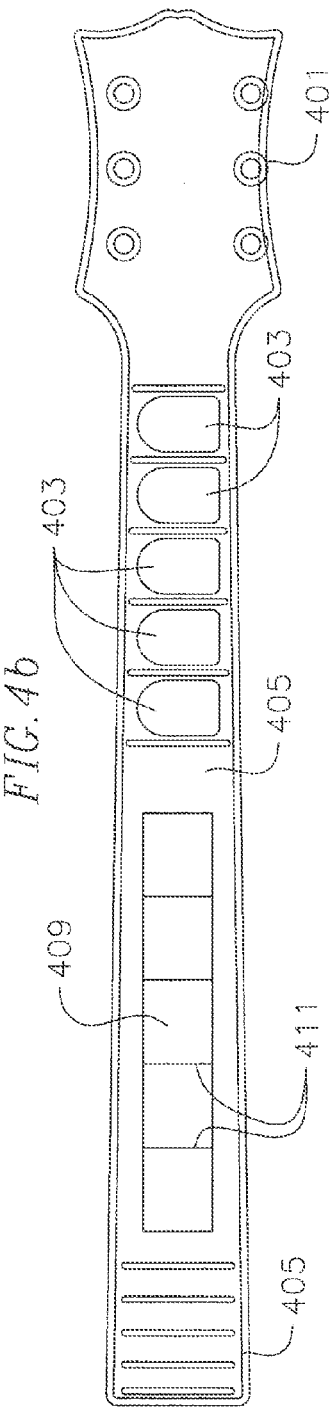

FIGS. 4a and 4b are examples of necks of a guitar shaped video game controller with two different embodiments of an analog slider input in accordance with aspects of the invention. Each video game controller neck includes a head 401, and a plurality of fret buttons 403 located near the head. Adjacent the plurality of fret buttons, further away from the head, is an analog slider input. In many embodiments of the invention, the neck of the guitar shaped video game controller may be removable from a video game controller body to facilitate ease of storage. The neck may attach to a slot in the body, and may include connection or interface circuitry to direct input signals generated by input devices on the neck to control circuitry in the body. An attaching mechanism may be located, for example, at one end 405 of the neck.

FIG. 4a illustrates an embodiment of the invention where an analog slider input 407 is a continuous touch pad. The touch pad is configured to be rectangular, and positioned longitudinally along a major axis of the video game controller neck. In most embodiments, the surface of the touch pad is recessed to rest slightly below the surface of the video game controller neck. Alternatively, the touch pad surface may also lie level or protrude slightly above the surface of the neck. The touch pad is a continuous analog pad, and generates an analog signal of the position of a user depression or actuation along the length of the touch pad. In some embodiments, the touch pad may also generate a signal of the position of user actuation along a width of the touch pad. Different guitar techniques involve moving or shifting strings laterally across a width of a guitar neck. A touch pad which detects lateral movement across the width of the touch pad may provide an effective means to simulate such guitar techniques. In many embodiments, the design of the slider input facilitates the continuous sliding of an actuator, for example, a finger or fingers of a user of the video game controller, along the slider surface, and generates an input signal reflecting the continuous motion. In some embodiments, a sliding tool, for example, an additional sliding actuator positioned over the slider input surface, may be provided as a feature on the neck or as an attachment, to provide a uniform or consistent actuating force along the surface of the slider input.

FIG. 4b illustrates an embodiment of the invention where the analog slider input 409 is a segmented touch pad. The general configuration of the slider input in the embodiment of FIG. 4b is similar to that of the embodiment of FIG. 4a, with the addition of a number of tactile markers, for example, markers 411, running laterally along the width of the touch pad, dividing the touch pad surface into segments. The markers may be in the form of, for example, raised bumps, or for example, recessed crevices. In many embodiments, there are four equidistant markers, delineating five equally sized segments. In other embodiments, the number of segments delineated may vary depending on the application of the video game controller in conjunction with various different video games. In some embodiments, the segments are color coded, either outlined or shaded different colors, providing users a quick and easy way of differentiating between the different segments during game play. The input signals generated by the slider input of FIG. 4b may be either digital or analog. A digital slider input may include a separate sensor for each separate segment, the sensors detecting actuation of any portion of their associated segments. An analog slider input may be configured similar to the slider input of FIG. 4a, where an analog signal is generated reflecting the position of an actuation or actuations along the longitudinal axis of the touch pad. In some embodiments, there may also be one or more longitudinal tactile markers running along the length of the touch pad, dividing the touch pad into multiple longitudinal segments. In these embodiments, the touch pad may detect movement in a lateral direction across the width of the touch pad, and longitudinal markers may assist users in determining where along the width of the touch pad their fingers or other actuators are currently located.

Figure 4C:
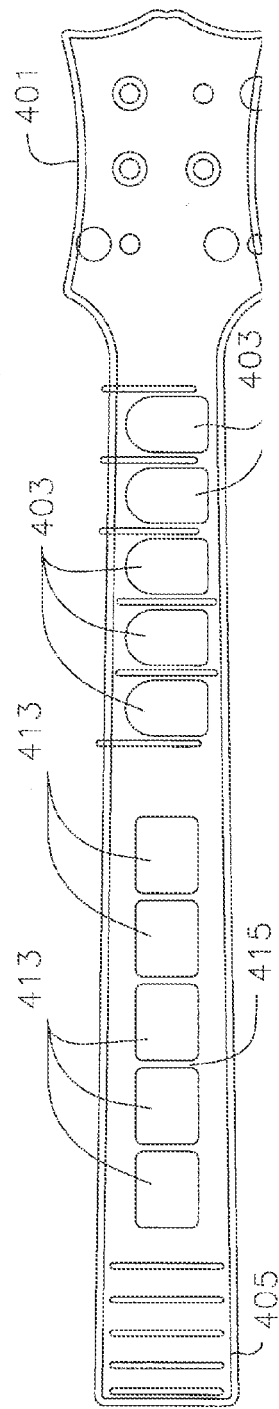
Figure 6:
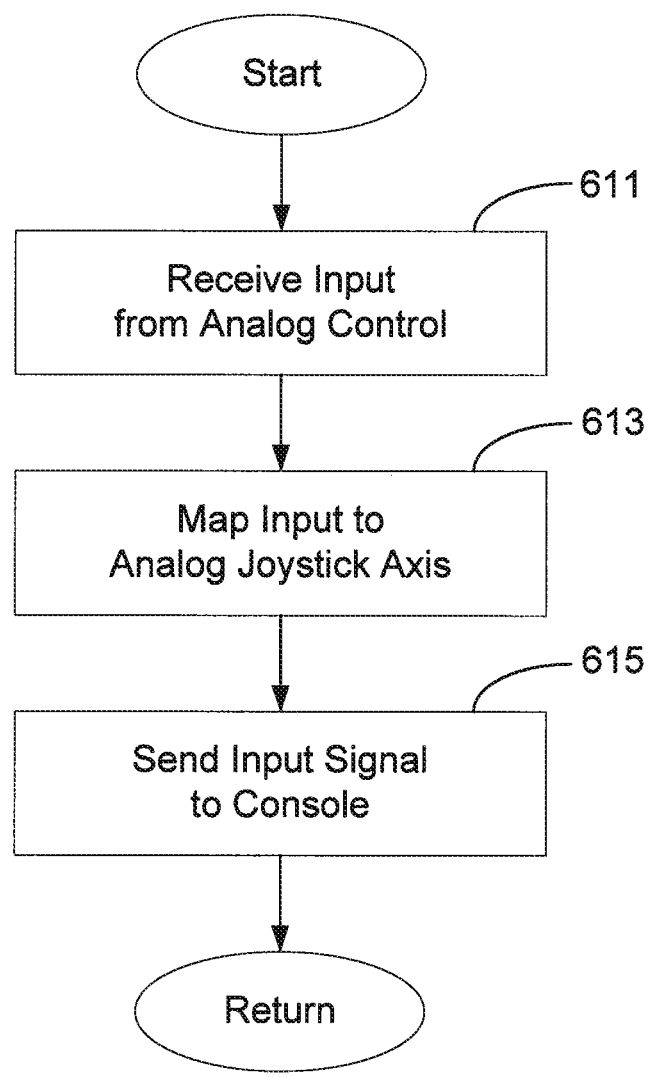
FIG. 6 is a flow diagram of the process of generating an input signal from an analog control device in accordance with aspects of the invention.
Figure 7:
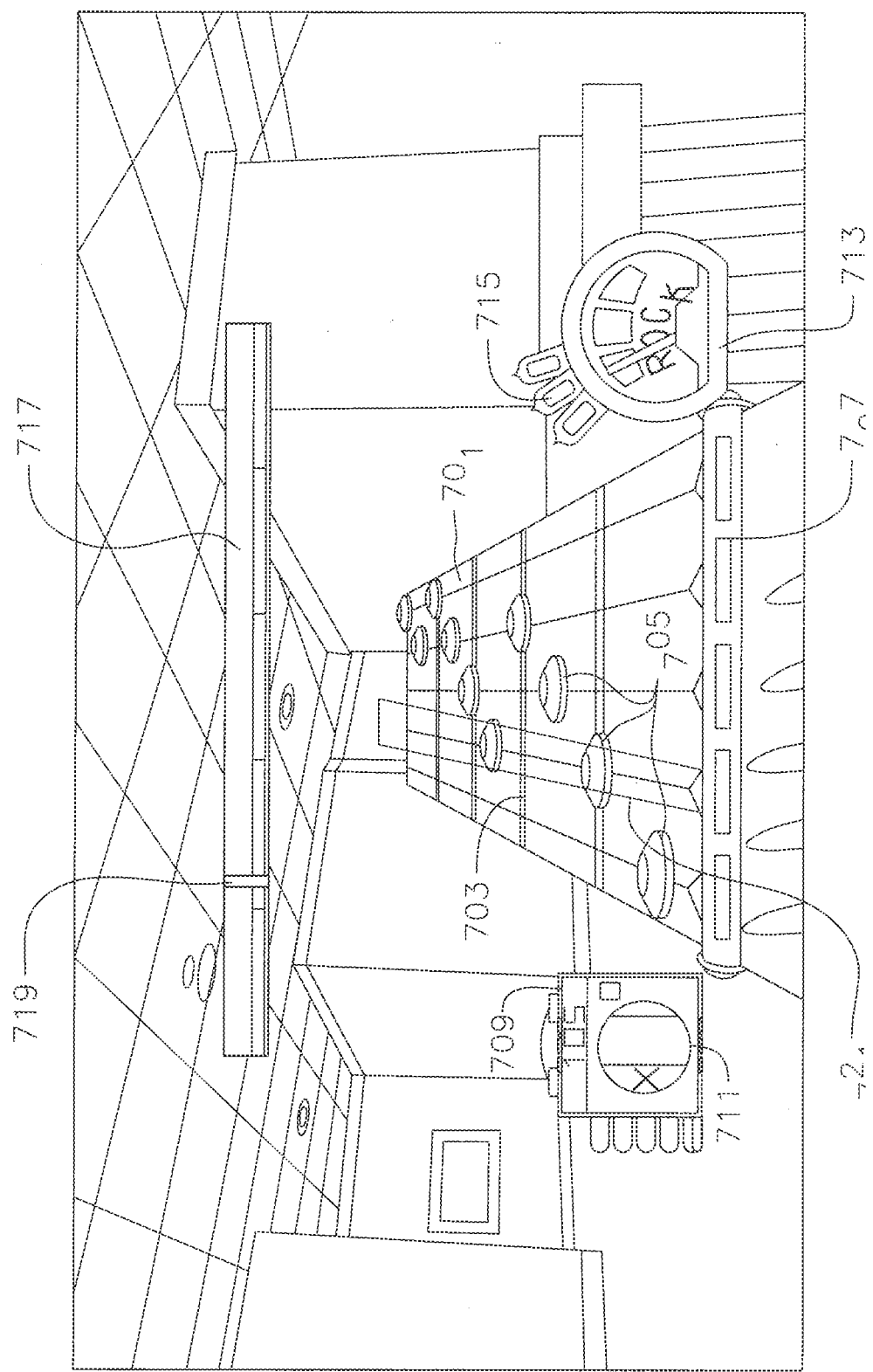
FIG. 7 is an example of a screen shot of a music rhythm video game during video game play in accordance with aspects of the invention.

In some embodiments, particularly embodiments relating to some game play features, for example as discussed with respect to FIGS. 6 or 7, buttons are used in place of the slider input. While the slider input may be considered an analog or multi-bit capable device, buttons are generally binary devices, at least in the context of video game controllers. In addition, buttons generally present a different tactile experience to a user. FIG. 4c illustrates a plurality of buttons 413. The buttons are arranged in a manner similar to the touch pad segments of FIG. 4b, but are separated into discrete sections, divided by portions of the surface of the video game controller neck, for example, surface 415. The buttons may be slightly recessed from the surface of the video game controller neck, the recess being comparable to touch pad embodiments of the invention described above. The buttons may instead be raised, protruding above the surface of the video game controller neck. In those embodiments, the shape of the buttons may be formed to be easily distinguishable by feel from the fret buttons. The buttons are usually configured to generate binary input signals, one for each individual input button. In alternate embodiments, a touch pad, similar to the touch pads discussed with regards to FIGS. 4a and 4b, may be disposed beneath the surface of the input buttons. Depression of each input button may be detected by a portion of the touch pad, and an analog signal may be generated corresponding to the depression position. While sliding an actuator between input buttons may be more difficult than with touch pad embodiments, the discrete segmenting of the input buttons may serve as a more definite input generating alternative.

Figure 5A:
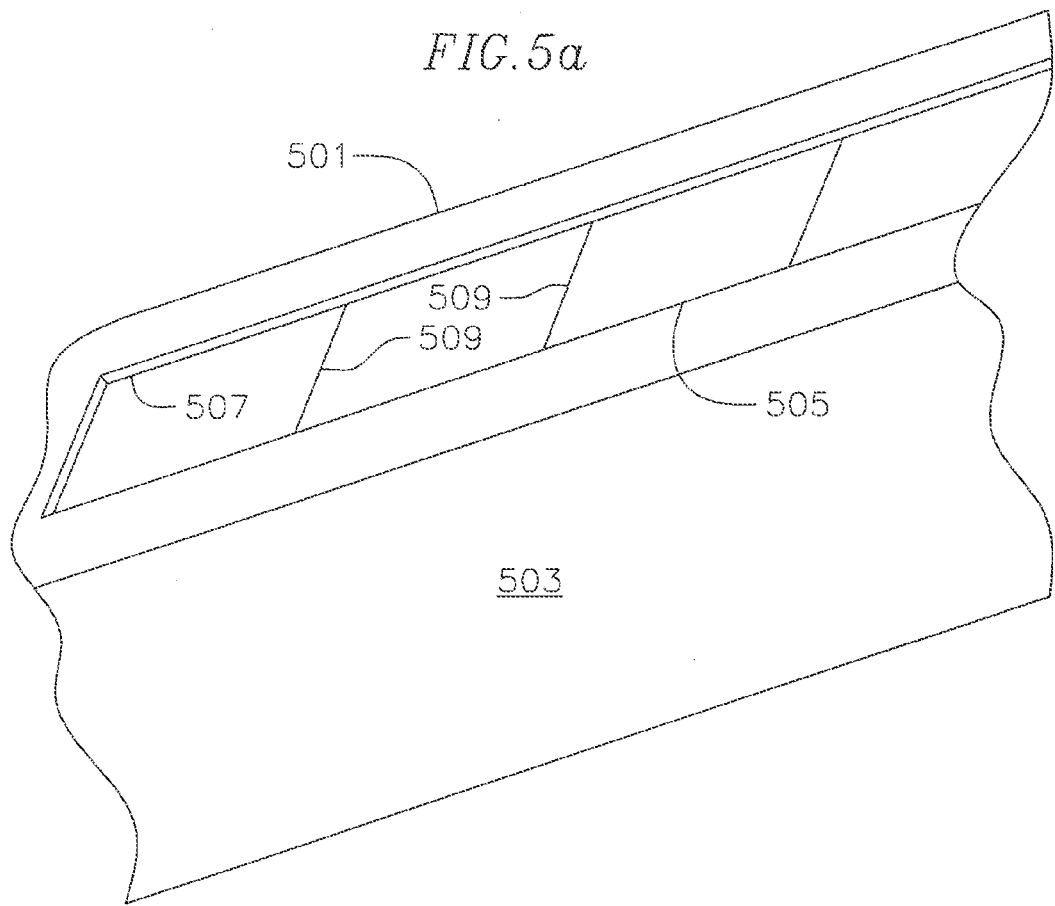
FIGS. 5a and 5b are illustrations of the structure of an embodiment of an analog control device in accordance with aspects of the invention.
Figure 5B:
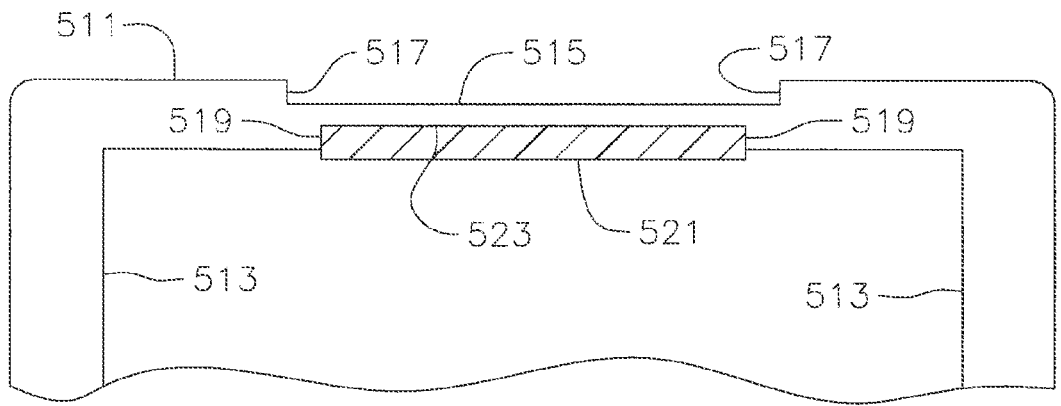

FIGS. 5a and 5b are illustrations of the structure of an embodiment of an analog control device in accordance with aspects of the invention. In some embodiments, the structural illustrations may be close-up examples of the segmented touch pad slider input discussed with respect to FIG. 4b. FIG. 5a is a side profile of a segment of a neck of a guitar shaped video game controller. Illustrated are a top surface 501 and a side wall 503 of the video game controller neck. A portion of a touch pad slider input 505 is located on the top surface. The touch pad is rectangular in shape and runs longitudinally along the major axis of the neck. The surface of the slider input is slightly recessed 507 from the top surface of the neck. Dividing lines, for example, lines 509, run laterally across the width of the surface of the touch pad and divide the touch pad into equally sized segments. The dividing lines may be bumps slightly raised above the surface of the touch pad, or crevices further recessed below the surface of the touch pad. The dividing lines are tactile, designed to be identifiable by touch, whereby a user may detect the crossing over from one segment into an adjacent segment when his finger slides over one of the dividing lines.

FIG. 5b is a cross section of an analog control device on a neck of a guitar shaped video game controller. FIG. 5b may be a cross section of a continuous touch pad slider input or a segmented touch pad slide. In some embodiments, FIG. 5b may be a cross section of a portion of the analog control device of FIG. 5a. The neck of the guitar shaped video game controller includes a housing with internal components. The housing includes a top surface 511, two sidewalls 513, and a bottom surface (not pictured). In the embodiment of FIG. 5, the analog control device is a recessed surface 515 molded directly into an exterior face of the top surface of the video game controller neck, with a first recess 517 molded into a central portion of the top surface. In alternate embodiments, the top surface may be molded with an opening instead of a recess, and a surface of a separate slider input component may be exposed through the opening. In the embodiment of FIG. 5b, a second recess 519 is molded into an interior face of the top surface. The second recess is illustrated smaller than the first recess, but may alternatively be the same size or larger than the first recess.

A printed circuit board with touch sensor 521 is attached to the interior face of the top surface, positioned inside the second recess and making contact with an inner surface 523 of the second recess. The printed circuit board may facilitate touch sensing in a variety of ways. In various embodiments, the printed circuit board may be, for example, an electric field proximity sensor, a resistive based sensor, a capacitive touch sensor, which may for example operate based on moveable relative position of capacitive plates or based on shunting of energy to an appendage such as a finger approximate fixed capacitive plates, or other touch sensing technology known in the art. In each of these embodiments, the printed circuit board detects a finger or other actuator that comes in contact with or in some embodiments is approximate an outside surface of the analog control device. A portion of the printed circuit board detects contact made to the portion of the surface above it, and an analog input signal is generated based on the position of contact.

FIG. 6 is a flow diagram of the process of generating an input signal from an analog control device in accordance with aspects of the invention. For compatibility with a particular video game console, the input signals produced by the analog control device on a new guitar shaped video game controller may be mapped to input signals typically generated by a default video game controller associated with the video game console. Mapping inputs ensures compliance with the controller application programming interface associated with the particular video game system. In embodiments of the invention where an actuation position along a continuous or segmented touch pad is detected, an analog input corresponding to the detected position may be mapped directly onto analog values of an axis of an analog control stick on a default controller. In embodiments with digital input segments or buttons, a collection of all the input combinations may be mapped to the same analog control stick axis, with each combination mapped to a discrete value corresponding to a particular position along the axis.

In block 611, the process receives an input from the analog control device. In most embodiments of the invention, an input on the analog control is received, and the process initialized, without activation of the strum input. In these embodiments, any actuation of the analog control device generates an input. In embodiments with an analog slider input, the input may include position information related to a detected actuation along the analog slider input. In embodiments with buttons, the input may include information of the combination of activated buttons. In alternate embodiments of the invention, an input may be received from the analog control device when a strum input is simultaneously activated.

In block 613, the process maps the received input to an analog input along an axis of an analog control stick or joystick of a default video game controller for the video game console. In embodiments of the invention with an analog slider input or touch pad, the length of the analog control may be mapped directly onto the axis. In these embodiments, one end of the analog control may be mapped to an input signal generated by a control stick fully deflected in a first direction along an axis. The other end of the analog control may be mapped to an input signal generated by the control stick fully deflected in the opposite direction along the axis. The remaining positions along the analog control are mapped correspondingly to the intermediate positions between the two ends, with the center of the analog control mapped to an input signal generated by the control stick in a neutral position.

In embodiments of the invention with buttons, the buttons may also be mapped to the same axis of the control stick used in the analog embodiments of the invention. Generally in embodiments using buttons, possible button combinations are mapped to discrete values along the axis. In embodiments with five digital input devices, there are a total of 32 different button combinations, taking into account combinations using zero, one, two, three, four, and all five button inputs. In these embodiments, 32 specific positions along the axis are selected, and each of the button combinations is mapped to one of the 32 specific positions, so that each of the combinations generates a particular analog input signal along the axis.

The process digitizes analog input signals from control stick axes. In most embodiments, digitization is performed in accordance with the controller application programming interface for each respective video game console. Generally, the analog signal is converted to a multi-bit digital signal recognizable by the video game console, the conversion being performed by an analog-to-digital converter in the video game controller. For example, the analog axis may be divided into 128 regions, and a multi-bit digital signal may be generated based on which of the 128 regions the input signal is located or falls within.

In block 615, the process sends the converted input signal to the video game console. After an input signal is generated, control circuitry in the video game controller routes the input signal to the video game controller, either through a wire or cable connecting the video game controller to the video game console, or through a wireless connection. After the input signal is sent, the process returns.

FIG. 7 is an example of a screen shot of a music rhythm video game during video game play in accordance with aspects of the invention. The screen shot displays a segment of video game play where the analog control is being utilized. The screen shot includes a scrolling music track 701 in the center of the display. The scrolling music track provides users with instructions on how to operate and manipulate their video game controllers at particular times, for example, how the analog control is to be operated to be in compliance with video game play.

As illustrated, the scrolling music track scrolls vertically from top to bottom. In some embodiments, the width of the music track is narrower at the top and wider at the bottom, possibly giving users the impression that the bottom is closer than the top and that the music track is scrolling towards them. Horizontally across the music track are displayed a series of equidistant horizontal lines, for example, line 703, the horizontal lines perhaps corresponding to the music tempo. Also displayed on the music track are various colored gems, for example, colored gems 705. The colored gems indicate the sections of the analog control to depress to be in compliance with user instructions of the video game. In embodiments with both an analog control input and traditional fret button inputs, the colored gems or similar instructive cues for the analog control input may be distinguishable from fret button gems, so users may differentiate between the two types of instructions and determine which input device or devices to operate. For example, while traditional fretting gems may be solid in color, instruction gems for the analog control input may instead appear clear or translucent. In the embodiment of FIG. 7, the colored gems are arranged into five vertical columns, where each of the columns corresponds to an area on the analog control. In embodiments where the analog control on the video game controller is segmented, each of the vertical columns may represent one of the segments on the analog control. A horizontal NOW bar 707 is fixed in position across the bottom of the music track, and is likewise divided into five sections. As the music track scrolls down, the colored gems intersect the NOW bar. To be in compliance with user instructions, users actuate the portion of the analog control corresponding to a particular column when a colored gem in that column reaches or crosses the NOW bar. In some embodiments, however, users may be considered to be in compliance with user instructions provided by any particular gem if the portion of the analog control corresponding to the particular column in which the gem appears is actuated at any time during display of the gem, for example while a displayed gem is scrolling towards, but has not yet reached, the NOW bar.

In many embodiments notes or other portions of a song are played if a user complies with user instructions, in addition to possibly increasing the user point score, power level, or otherwise modifying, generally in a positive way, a value associated with or a capability provided the user. Similarly, in many embodiments an audible indication may be provided if the user does not comply with user instructions, in addition to possibly decreasing the user point score, power level, or otherwise modifying, generally in a negative way, a value associated with or a capability provided the user. In addition, in some embodiments, In addition, in some embodiments operation of the analog control during game play may result in additional sounds being provided, for example over or in place of notes or other portions of the song, and the operation and sounds may be as discussed below with respect to embodiments with a free play environment.

Analog control sections of video game play may be configured and look much like other similar sections of game play, for example, sections where users are directed to operate fret buttons and a strum bar on the video game controller rather than the analog control. In some embodiments, the colored gems of the analog control sections may be visually distinct from colored gems of other game play sections, indicating to users when to utilize the analog control. In embodiments using an analog slider input, sections of video game play may feature music tracks with more instances of single gems crossing the NOW bar at a given time, as well as instances where gems in adjacent columns cross the NOW bar successively. Such arrangements encourage users to slide their fingers or other actuators up and down the analog slider input to comply with the video game instructions.

In some embodiments of the invention, including embodiments with a free play environment, the analog control may be used in a variety of different ways in either a regular game mode or a free play mode. In some embodiments, different portions or segments of the analog control may be used to tap different notes. For example, an instructive cue for an arpeggio may be presented to a user, or a user may want to play arpeggios up or down a particular chord in, for example, the free play environment. The analog control may be used in these embodiments, for example, to simulate arpeggios or sweep picks on a real guitar, in other words, the playing of individual notes up and down a selected chord by tapping different areas or segments of the analog control. Various other guitar techniques may be simulated using an analog control in a similar fashion, for example, finger tapping and harmonics. Finger tapping involves generating sounds on an electric guitar by tapping on, sliding over, or bending individual strings by both hands. Harmonics involves picking individual strings with one hand while gently pressing against them with the other hand, producing harp-like sounds. These techniques may be mimicked through tapping of different areas of the analog control by the user.

In some embodiments, different fluidly changing audio sounds, for example, fluid note or pitch changes, may also be generated using the analog control. Simulated dive bombs may be performed on the video game controller using an analog control. That is, a quick drop in pitch of a particular chord played on the video game controller may be performed by running a finger or actuator along the surface of the analog control. Other techniques, for example, string bends, string vibratos, and pick slides, may be performed in a similar manner. String bending involves pushing against a string to increase its tension, thereby changing the pitch of the sound the string generates while it is resonating. String vibrato involves pushing against and vibrating a sting in an up and down motion or a left and right motion repeatedly. A touch sensor may, for example, be used to detect a degree of movement and apply different sound samples for different amounts of movement. Pick sliding or pick scraping involves running an edge of a pick along the windings of a string of an electric guitar, generating a quick rising or dropping scraping sound. In various embodiments, these techniques may be performed by, for example, running a finger or other actuator across the surface of the analog control. Furthermore, in normal game play mode, various different types of visual instructive cues or markers may be provided to instruct a user to perform the various different techniques. Video game instructions may provide a scoring algorithm according to compliance with the user instructions.

Some embodiments of the invention may provide a guitar solo or similar feature. The feature may be activated by, for example, the depression of a predefined input device on the video game controller, or for example, the execution of a predefined sequence of fret input combinations. The feature may provide users with a window of free play, much like a solo segment, while in a regular game play mode. During the window of free play, for example, fifteen or thirty seconds, users may operate the video game controller in any way they wish, and may incorporate features, for example, as described herein, pertaining to the analog control. For example, users may operate the analog control to generate finger tapped notes through the video game console. In some embodiments, users may also operate the fret inputs and strum input to generate input signals which the video game console converts into audio samples, and subsequently run a finger along the surface of the analog control to change the pitch properties of an audio sample being outputted or held. Once the window of free play ends, the video game may revert to regular game play mode, where the user is provided with instructive cues and assessed points and feedback based on compliance.

The screen shot also includes general information pertaining to user performance. In the embodiment of FIG. 7, information features include a score display 709 and a score multiplier display 711 located to the left of the music track, and a power meter 713 and star power meter 715 located to the right of the music track. Based on the embodiment of the invention, different types of visual displays may be incorporated in a user interface to communicate to users valuable game play information and status reports based on the particular video game being played.

Among the additional status indicators included in the screen shot of FIG. 7 is a slide status bar 717 located above the music track. The slide status bar indicates the locations or locations of the analog control currently being depressed or actuated. The slide status bar is separated into five different colored sections matching the colors of the colored gems and NOW bar on the music track. A status marker 719 indicates the actual actuation position along the analog control, and moves left and right along the slide status bar based on changes in actuation position along the actual analog control. Furthermore, in some embodiments, the column corresponding to the area of the analog control currently being actuated may be highlighted 721 on the music track to assist a user in more easily identifying the actuated area.

Figure 8:
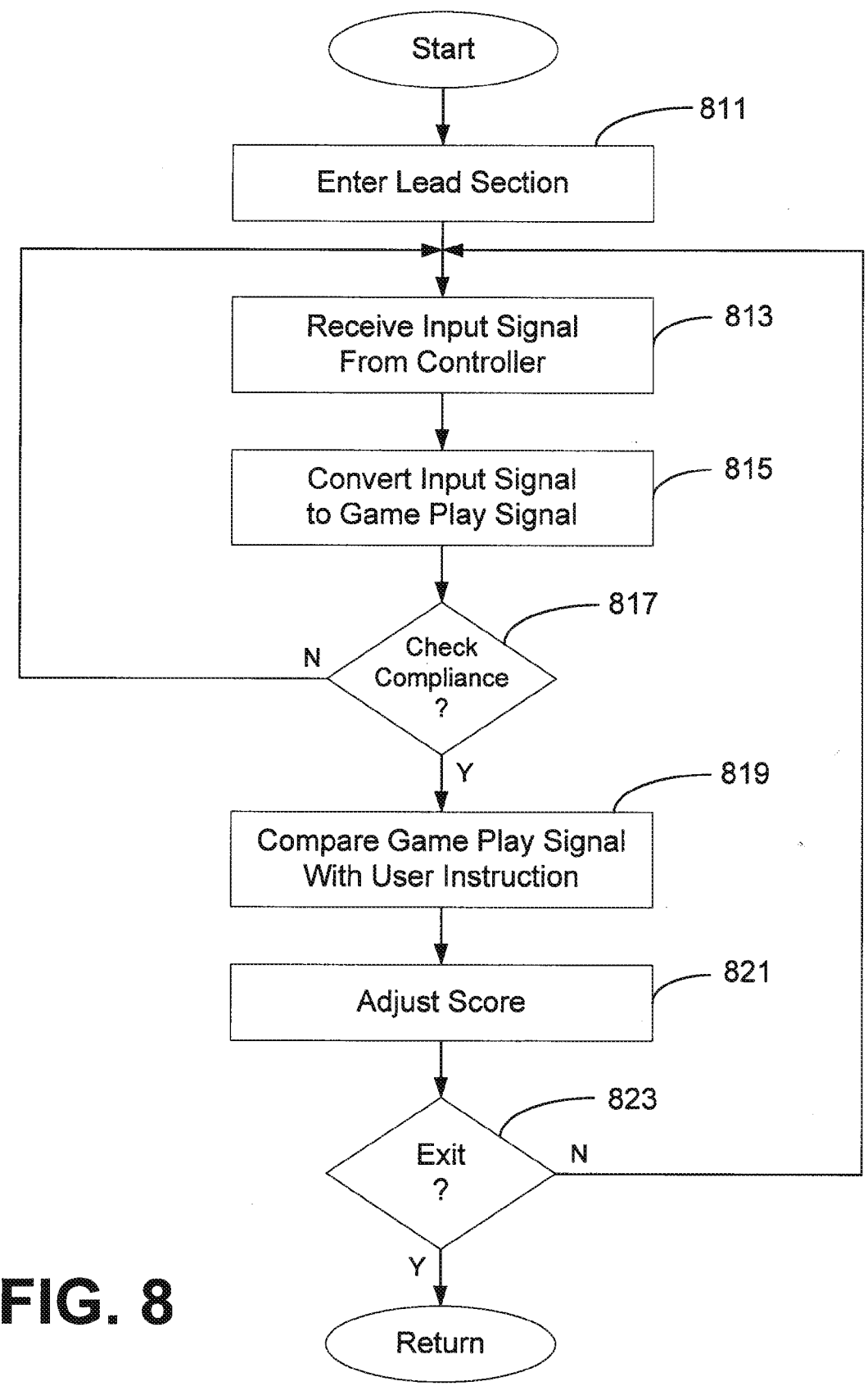
FIG. 8 is a flow diagram of the process of checking compliance of game play signals with video game instructions in accordance with aspects of the invention.

FIG. 8 is a flow diagram of the process of checking compliance of game play signals with video game instructions in accordance with aspects of the invention. In many embodiments, the process of FIG. 8 may be performed during video game play of the music rhythm video game featuring the screen shot illustrated in FIG. 7.

In block 811, the process enters a section using the analog control. In some embodiments, an analog control section may be characterized as a lead section, representative of a section where a lead guitarist of a band plays a solo. Entering a lead section may be indicated in a variety of ways. Visual indicators may include, for example, the appearance of the NOW bar and/or slide status bar described with respect to FIG. 7, or for example, the changing of a background or the shapes of colored gems associated with video game play. A lead section may involve the exclusive use of the analog control on the guitar shaped video game controller, or a combination of the analog control with other input devices located on the video game controller.

In block 813, the process receives an input signal from a video game controller. In some embodiments, the input signal originates from an analog control on the video game controller and is sent by the control circuitry in the video game controller to a video game console. In some embodiments, the input signal is generated from the input signal generating process of FIG. 6, where inputs from the analog control are mapped to positions along an axis of an analog control stick on a default video game controller. The input signal includes information of a contact position detected by a touch sensor of the analog control. The input signal may be used to modify display information, for example, the slide status bar as described in FIG. 6.

In block 815, the process converts the input signal to a game play signal. In most embodiments, user compliance with user instructions while in a lead section is dependent on whether the analog control is being actuated in correct regions at specified times. In embodiments of the invention where the analog control is separated into five regions, the game play signals may indicate which of the five regions are being actuated or depressed.

In block 817, the process determines whether to check compliance of the game play signal with the user instructions. In some embodiments, compliance checks are performed when, for example, a gem or gem combination reaches or crosses the NOW bar, as was seen in the screen shot of FIG. 7. In some embodiments, however, compliance checks are performed periodically, or in some embodiments on change of status of controller inputs. If the process determines that a compliance check should not be performed, the process returns to block 813 to receives another input signal from the controller. If the process determines that a compliance check should be performed, the process proceeds to bock 819.

In block 819, the process compares the game play signal indicating the active region or regions of the analog control with user instructions. The user instructions are generally represented by a gem or gem combination which is crossing or had just crossed the NOW bar. The processor of the video game controller determines a game play signal to be correct if the game play signal indicates a user operating the video game controller has complied with the user instructions. If the game play signal does not match the expected signal, the game play signal is determined to be incorrect.

In block 821, the process adjusts the user score. In most embodiments, correct game play signals are awarded a higher score or a predefined amount of points to add to an existing score. Conversely, incorrect game play signals may be awarded no extra points, and in some embodiments, points may be deducted from the existing user score, or the game may be completely stopped or reset. Other point tallies or progress calculations associated with video game play may be related to score adjustment. For example, the processor may keep track of a running total of consecutive correct game play signals, and output the running total as a combination score, which is reset to zero whenever an incorrect game play signal is detected.

In block 823, the process determines whether to exit the lead section. If the lead section has not concluded, the process returns to block 813 to receive another input signal from the video game controller. If, however, the lead section has ended, the process returns. In most embodiments, when video game play exits a lead section, it returns to a regular game play mode involving signal generation using more traditional inputs on the guitar shaped video game controller, rather than the analog control.

The invention therefore provides for an analog control device on a video game controller for, for example, a music rhythm video game. Although the invention has been described with respect to certain embodiments, it should be recognized that the invention may be practiced other than as specifically described, the invention comprising the claims and their insubstantial variations supported by this disclosure.

What is claimed is:

1. A guitar shaped video game controller including an analog control device, comprising:
    a recessed surface molded into an exterior face of a surface of a neck of the guitar shaped video game controller, the recessed surface including at least one position marker to divide the recessed surface into a plurality of regions; and
    a printed circuit board with a touch sensor attached to an interior face of the surface opposite the recessed surface;
    wherein the printed circuit board detects contact made in the recessed surface; and
    wherein control circuitry of the guitar shaped video game controller generates an input signal recognizable by an associated video game console as values of an axis of a control stick of a default controller, the input signal corresponding to a position of contact made on the recessed surface.

2. The guitar shaped video game controller of claim 1, wherein the plurality of regions are separated by tactile lines running across the recessed surface.

3. The guitar shaped video game controller of claim 1, wherein the touch sensor on the printed circuit board is an electric field proximity sensor.

4. The guitar shaped video game controller of claim 1, wherein the touch sensor on the printed circuit board is a resistive based touch sensor.

5. The guitar shaped video game controller of claim 1, wherein the touch sensor on the printed circuit board is a capacitive touch sensor.

6. The guitar shaped video game controller of claim 1, wherein the touch sensor on the printed circuit board is a radio frequency based touch sensor.

7. The guitar shaped video game controller of claim 1, wherein the dimensions of the printed circuit board are substantially similar to the dimensions of the recessed surface.

8. The guitar shaped video game controller of claim 1, further comprising a sliding actuator for contacting the recessed surface.

* * * * *

UNITED STATES PATENT AND TRADEMARK OFFICE
CERTIFICATE OF CORRECTION

PATENT NO. : 8,827,806 B2  
APPLICATION NO. : 12/124112  
DATED : September 9, 2014  
INVENTOR(S) : Jack J. McCauley, Brian Bright and John Devecka Page 1 of 1

It is certified that error appears in the above-identified patent and that said Letters Patent is hereby corrected as shown below:

In the Drawings:

In Sheet 7 of 8, FIG. 7, delete " 72 ", and insert --721--, therefor.

In Sheet 7 of 8, FIG. 7, delete " 707 ", and insert --707--, therefor.

Signed and Sealed this
Fifth Day of May, 2015

Michelle K. Lee
*Director of the United States Patent and Trademark Office*